(12) United States Patent
Howard et al.

(10) Patent No.: US 7,296,670 B2
(45) Date of Patent: Nov. 20, 2007

(54) DISCONNECT MECHANISM AND DEVICES INCLUDING SUCH A DISCONNECT MECHANISM

(75) Inventors: Darren Christopher Howard, Aylesbury (GB); Dennis Richard Hayward, Eaton Bray (GB); Rodney Stuart Howard, Hemel Hempstead (GB)

(73) Assignee: Goodrich Control Systems Limited (GB)

( * ) Notice: Subject to any disclaimer, the term of this patent is extended or adjusted under 35 U.S.C. 154(b) by 247 days.

(21) Appl. No.: 11/135,216

(22) Filed: May 23, 2005

(65) Prior Publication Data

US 2005/0262961 A1   Dec. 1, 2005

(30) Foreign Application Priority Data

Jun. 1, 2004   (GB) .................................. 0412203.2

(51) Int. Cl.
*F16D 9/08* (2006.01)
(52) U.S. Cl. .................... 192/144; 192/150; 464/31; 464/32
(58) Field of Classification Search ............... 192/144; 464/31, 32
See application file for complete search history.

(56) References Cited

U.S. PATENT DOCUMENTS

| 2,727,371 | A | * | 12/1955 | Troeger et al. ............. 464/160 |
|---|---|---|---|---|
| 2,862,375 | A | | 12/1958 | Miller |
| 3,220,218 | A | | 11/1965 | Rio et al. |
| 3,427,826 | A | | 2/1969 | Anderson |
| 3,620,046 | A | * | 11/1971 | Wenzel et al. ................ 464/33 |
| 4,244,455 | A | * | 1/1981 | Loker .......................... 192/24 |
| 4,271,947 | A | * | 6/1981 | Gaeckle .................... 192/82 T |
| 4,392,835 | A | | 7/1983 | Siddiqui et al. |
| 4,715,486 | A | * | 12/1987 | Burgdorf et al. ........ 192/107 M |
| 4,934,977 | A | * | 6/1990 | Falconer et al. ............. 464/31 |
| 4,997,072 | A | | 3/1991 | Lapthorne |
| 5,103,949 | A | * | 4/1992 | Vanderzyden et al. ........ 192/24 |
| 5,418,412 | A | | 5/1995 | Brucker |
| 6,059,085 | A | * | 5/2000 | Farnsworth ................ 192/55.1 |

FOREIGN PATENT DOCUMENTS

GB   1044094   7/1965

* cited by examiner

*Primary Examiner*—Richard M Lorence
(74) *Attorney, Agent, or Firm*—Andrus, Sceales, Starke & Sawall, LLP

(57) ABSTRACT

A disconnect mechanism is provided which, upon a suitable trigger event, such as excess temperature causes a camming element 40 having a tapered head 52 to move under the urging of a compression spring 60 such that the tapered head 52 becomes trapped between a rotating element 32 and a support 42. This gives rise to frictional inter-engagement which prevents further rotation of the rotating element 32 and thereby locks the rotating machine against further rotation. This is turn causes the shear region to fail thereby drivingly disconnecting the machine from its prime mover.

15 Claims, 6 Drawing Sheets

DISCONNECT MECHANISM AND DEVICES INCLUDING SUCH A DISCONNECT MECHANISM

FIELD OF THE INVENTION

The present invention relates to a disconnect mechanism and to a machine including such a disconnect mechanism.

BACKGROUND OF THE INVENTION

It is generally well recognised that it is useful to be able to disconnect a rotating machine, such as a generator, from its drive source or prime mover in the event of a fault developing within the machine. Where the fault is electrical, sensing equipment may cause electrical isolation of the generator. However where the fault is mechanical, for example the loss of lubricating or cooling oil or failure of an associated lubricating or cooling oil pump causing the generator to fill with oil, then the continued rotation of the machine may cause overheating resulting in catastrophic failure or a fire. If the generator is an aeronautical or aerospace generator, then this situation could result in damage to or impairment of the functionality of the engine or gearbox driving the generator. Therefore mechanical protection systems are required.

U.S. Pat. No. 5,103,949 discloses a protection system in which a generator receives its drive by a drive arrangement comprising two drive shafts which are coupled together via inter-engaging dogs. One of the shafts carries a screw threaded region 20 and is biased into engagement with the other shaft by a compression spring. In the event that it is desired to disconnect the drive, a spring loaded plunger is driven into a position where it can engage the screw threads and therefore give rise to a unscrewing action which separates the shafts from mechanical inter-engagement. This mechanism is relatively complex and increases the axial length of the generator and drive arrangement. Furthermore the disconnect mechanism is quite complex and hence will be relatively heavy.

U.S. Pat. No. 4,392,835 discloses an alternative system in which a tungsten carbide cutting blade is spring loaded such that it can be moved into engagement with the drive shaft when it is required to disconnect the generator. The shaft in the region of the cutting tool is formed as a relatively thin walled tube. Friction causes local heating and the relatively thin wall of the shaft becomes plastic, allowing the shaft to separate into two portions thereby disconnecting the drive to the generator. A concern with this arrangement is that it relies on the spring pressure on the cutting tool being great enough to cause the required shaft heating and subsequent failure. Therefore this disconnect mechanism may not operate efficiently in all circumstances. For example, the shaft may be rotating at a high speed and may be in an oil filled and/or cooled environment. The required frictional heating may take some time to develop. Furthermore, if the actuating spring is large enough to ensure that there will always be sufficient pressure to break the shaft then it will be large and relatively heavy and will require a large force to be generated by a trigger mechanism in order to release it.

Similar "shaft cutting arrangements" are described in U.S. Pat. No. 2,862,375 and U.S. Pat. No. 3,427,826.

It is common practice to provide a shear neck, that is a region of reduced thickness where structural failure will occur in the event of excessive loading, to protect the prime mover and/or gearbox from damage. The shear neck is provided irrespective of whether or not some other disconnect mechanism is also included. U.S. Pat. No. 5,418,412 shows an arrangement in which the provision of the shear neck is utilised. U.S. Pat. No. 5,418,412 is primarily concerned with a generator in which there is a possibility that an oil scavenge system may become incapacitated, thereby resulting in flooding of the generator. This could cause severe damage to the generator. In order to overcome this problem, a fluid brake in the form of an impeller is attached to one end of the generator shaft. If the generator starts to flood the impeller interacts with the oil to generate a large drag torque. This drag torque is greater than the shear torque engineered into the shear region and therefore causes the shear neck to fail thereby disconnecting the generator from the prime mover.

U.S. Pat. No. 3,620,046 discloses a shaft having one or more shear necks and also carrying an integrally formed part conical disc region of enlarged radius. A coaxially mounted brake component is mounted such that upon release of a latch mechanism (latch pin 25) the brake component moves under the urging of compression springs so as to engage with the disc region. This gives rise to a braking force acting on the disc leading to failure of the shear neck so as to disconnect the drive. The moving brake component is mounted to a housing of the device by inclined keys which serve to increase the application force between the brake component and the disc in response to torque caused by the frictional inter-engagement of these components. A significant disadvantage of this design is the large contact area between the moving and stationary parts. Unless the springs are very strong there may not be sufficient "bite" to enable the non-rotating component to "latch" onto the rotating part. The presence of lubricant only makes this problem worse. The mechanism is also relatively bulky and heavy.

GB 1044094 discloses a disconnect device in which loading of a shaft causes failure of a shear neck. The loading mechanism comprises a flange having axially extending projections (14). A spring loaded pin is held within a housing and can be moved axially to engage with the projections. A concern over this design is that high speed rotation of the shaft could result in the pin either bouncing off the projections or being worn away by successive contact.

U.S. Pat. No. 3,220,218 discloses a disconnect mechanism in which a cam is helically threaded on a drive shaft. A disconnect element is moved to a position so as to engage one of the radially extending surfaces of the cam thereby stopping the cam from rotating. The cam then moves along the thread until it engages an end stop where the shaft is loaded to cause a shear region to fail. Again there is a risk that high speed rotation of the shaft could cause the disconnect element to bounce off the cam rather than operating the disconnect mechanism as intended.

SUMMARY OF THE INVENTION

According to a first aspect of the present invention there is provided a disconnect device for disconnecting a driven device from a drive, where a drive transfer element having a shear region transmits torque between the drive and the driven device, the disconnect device comprising a camming element movable from a disengaged position to an engaged position where the camming element becomes caught between a rotating member on the driven device side of the shear region and a support such that rotation of the rotating member urges the camming element into a space between the rotating member and the support.

It is thus possible to provide a drive disconnect arrangement in which a camming element can be brought into engagement with, for example, a driven shaft, thereby causing a sufficient torque to be transferred across the shear region to cause failure of the shear region thereby disconnecting the driven device from the drive arrangement.

The camming element may, in the engaged position, bear against an outer surface of the driven shaft. Preferably the rotating member is a disc carried on the driven shaft or the drive transfer element and having an increased radius compared to the driven shaft or the drive transfer element. Since torque is a product of the braking force and the radial distance from the axis rotation, then acting on a disc of increased radius will give rise to a larger torque for the same braking force.

Advantageously a support element is provided adjacent the rotating member in order that the camming element can bear against the support thereby preventing the camming element from being forced radially away from the rotating member.

Preferably, when the camming element moves to engage with the rotating member at a contact region, the motion of the camming element and the motion of the surface of the rotating member at the contact region are in substantially the same direction.

Advantageously the camming member is profiled in order to increase its area of contact with the rotating member. An increased area of contact gives rise to increased frictional inter-engagement between the camming element and the rotating member. The surface area of inter-engagement between the camming element and the rotating member may be arranged by giving them co-operating non-planar profiles. Thus a simple cooperating profile would be for one of the camming element and the rotating member to have a concave surface, and the other one to have a convex surface formed with a similar radius of curvature. However other profiles, for example grooves of various cross-sections might also be envisaged. In embodiments where grooves or other constraining features, such as flanges, are spaced apart in a direction parallel to the axis of the rotation of the rotating member, then the camming element may be arranged to taper in a direction parallel to the axis of rotation as well as or instead of tapering in a direction perpendicular to the axis of rotation.

Advantageously the camming element is held in the disengaged position by a releasable locking arrangement. The releasable locking arrangement may comprise an actuator, such as a solenoid, which can be actuated to remove a locking element from engagement with the camming element, thereby allowing the camming element to move towards the engaged position. Advantageously the camming element is biased towards the engaged position, for example by a compression spring.

Alternatively, the locking element may itself be spring biased towards the unlocking position and may be held at the locked position by a temperature sensitive element. A suitable element is a eutectic pellet which is arranged to hold the locking element against the biasing force provided by a biasing arrangement, for example a spring. Thus, if the temperature of the driven device rises for some reason, such as failure of a lubricating system either preventing the circulation of cooling/lubrication oil or allowing the generator to fill with oil, then the temperature sensitive element will melt, thereby allowing the locking element to release the camming element to move to the engaged position.

Preferably an abutment is positioned in close proximity to the rotating member on a side of a rotating member substantially opposite to that of the camming element. A clearance exists between the rotating element and the abutment when the camming element is at the disengaged position. However, once the camming element moves to the engaged position, then free play in the bearings or other support structure supporting the rotating member may allow the rotating member to move into engagement with the abutment thereby giving rise to a further force acting to hold the rotating element against further rotation.

Preferably the camming element is arranged to translate linearly from the disengaged position to the engaged position. However the camming element may be arranged to rotate about a axis during its motion from the disengaged to the engaged position. In such an arrangement, the camming arrangement still becomes entrained between the rotating member and the support.

BRIEF DESCRIPTION OF THE DRAWINGS

The present invention will further be described, by way of example, with reference to the accompanying drawings, in which.

DESCRIPTION OF PREFERRED EMBODIMENTS OF THE INVENTION

Figure 1:
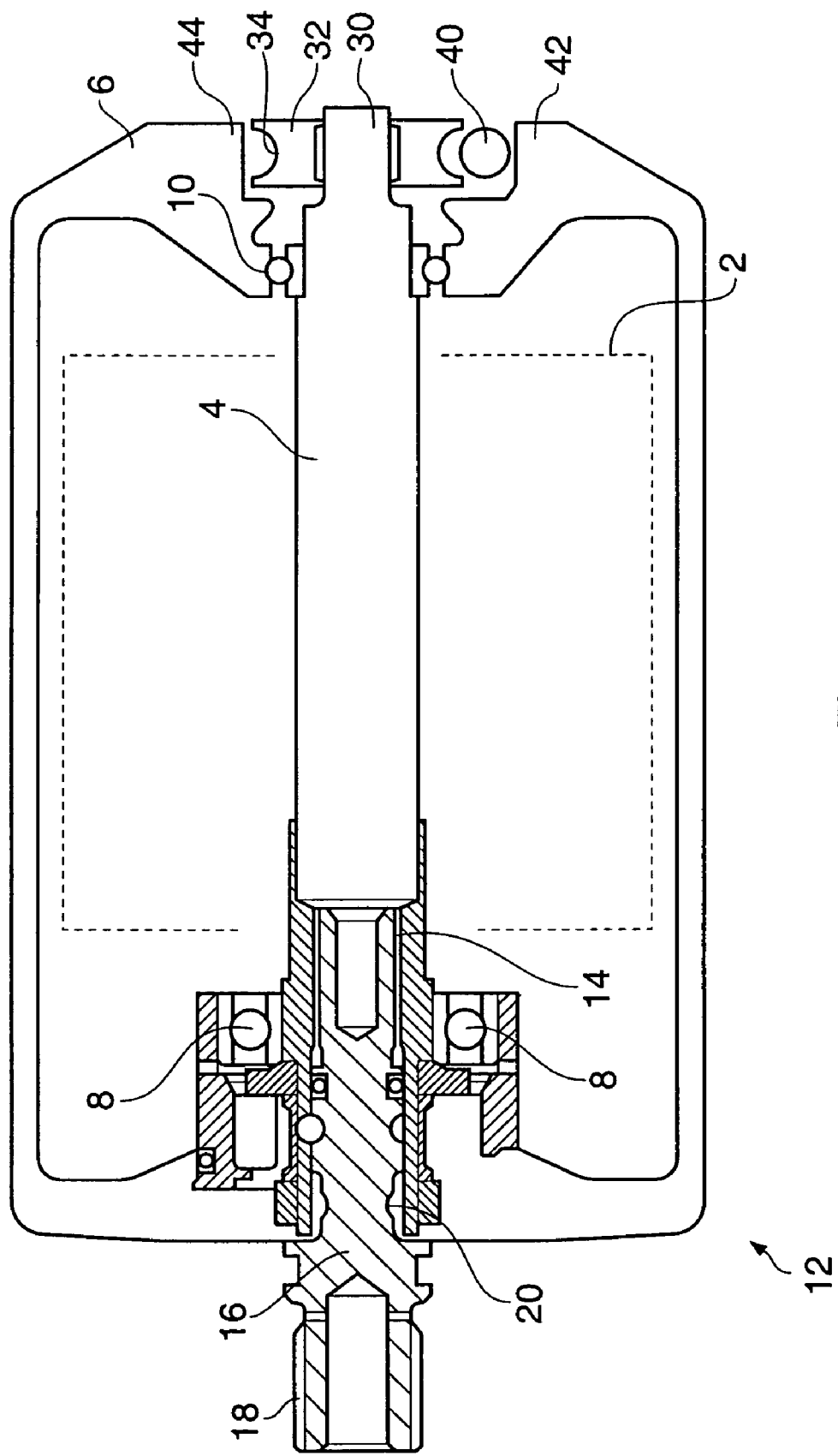
FIG. 1 schematically illustrates a generator having a disconnect arrangement constituting an embodiment of the present invention.

FIG. 1 schematically illustrates a generator constituting an embodiment of the present invention. Since the invention relates to a disconnect arrangement for a rotating machine and is not specifically limited to use with the generator, then the electrical components of the generator do not constitute part of this invention and hence for simplicity will be assumed to reside within the dotted outline 2. The generator comprises a generator shaft 4 which is supported within a generator housing 6 by bearings 8 and 10. A first end 12 of the generator shaft 4 has a hollow region carrying inwardly facing splines 14 which, in use, drivingly inter-engage with co-operating outwardly facing splines of a stub shaft 16. The stub shaft 16 has a further set of splines 18 which drivingly inter-engage with co-operating splines of a further shaft, gearbox or the like driven from a prime mover 19. A central portion of the stub shaft 16 is thinned in order to form a shear neck 20. The shear neck 20 forms an engineered region of weakness in the drive chain between the prime mover and the generator. Thus torque exceeding a predetermined value within the drive train will cause the shear neck 20 to fail.

A second end 30 of the shaft 4 carries a rotating member 32. The rotating member 32 is in splined or keyed engagement with the second end 30 of the shaft 4 so as to rotate with the shaft. As shown in FIG. 1, the rotating member may have a profiled outer surface 34 which, in this example, is concave giving the rotating element 32 the appearance of a pulley wheel.

A camming element 40 is disposed adjacent one side of the rotating member 32 and is positioned between the rotating member 32 and a support 42 which, in this example, is integrally formed with the generator housing 6. An abutment region 44 is formed adjacent the rotating member 32 at a position opposing the camming element 40 and, for convenience, the abutment 44 may also be formed as an integral part of the generator housing 6.

Figure 2:
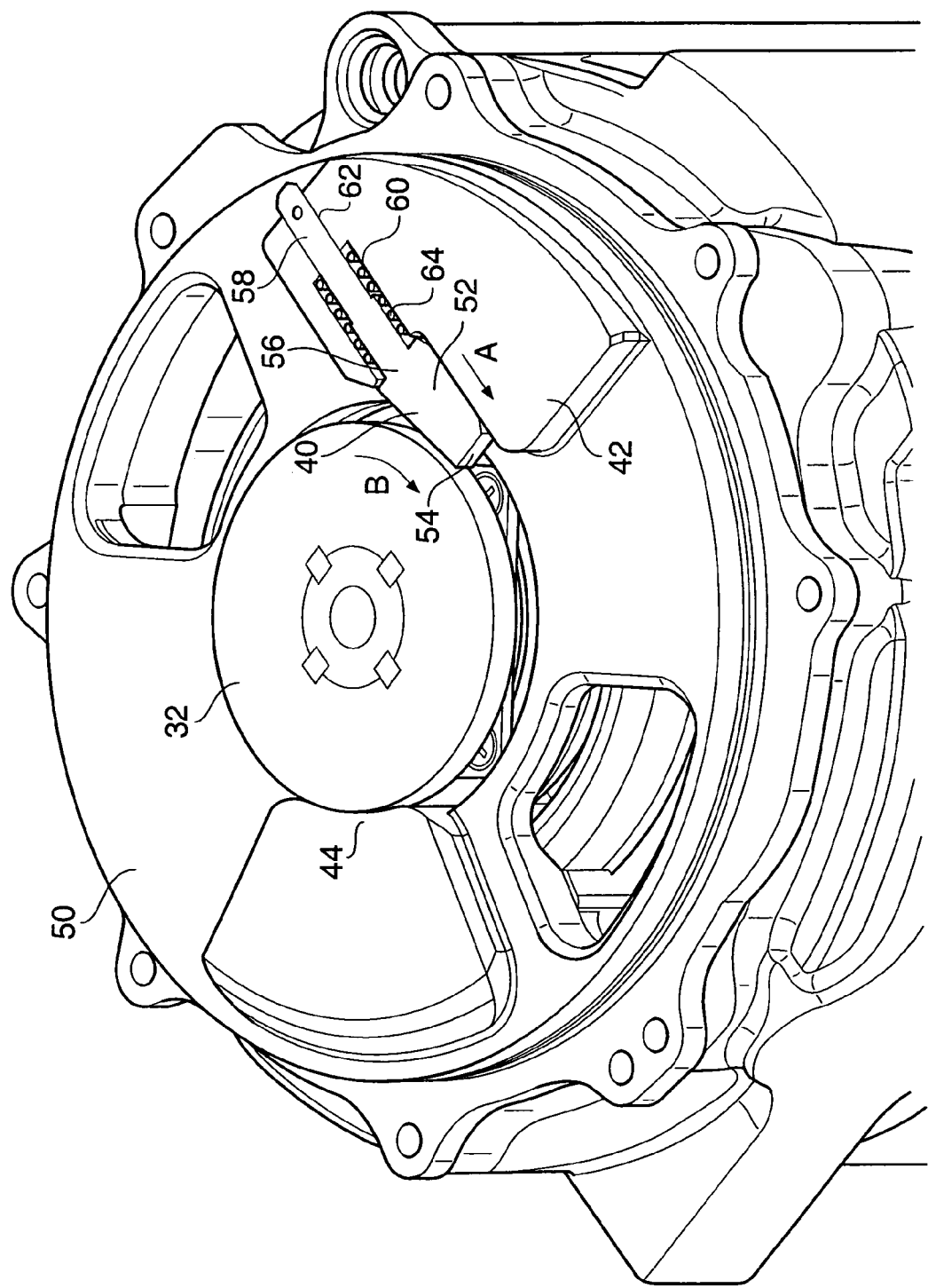
FIG. 2 is a perspective view of a first embodiment of the disconnect arrangement in greater detail.

FIG. 2 is a perspective view of the end portion of the generator in greater detail. In the arrangement shown in FIG. 2 the support 42 and the abutment 44 are carried on an end plate 50 which can be bolted to the generator housing 6.

It can be seen that the camming element 40 comprises a tapered head 52 whose width increases from a relatively narrow end region 54 to a thicker rear end portion 56. The head 52 of the camming element 40 has an elongate tail 58 extending therefrom which passes through a duct 60 formed as part of the support 42. The tail 58 also passes, in a clearance fit, through a narrower channel 62, and a portion of the tail 58 extends beyond the channel 62. Within the duct 60 a gap exists between the side of the duct and the tail 58 and a compression spring 64 is located in the gap. The spring 64 extends between the closed end of the duct 60 and an end face of the enlarged head 52 and thereby urges the camming element 40 into an engaged position in which the head 40 engages with the rotating member 32 and also with the support 42, becoming trapped therebetween.

In order to hold the camming element 40 at the disengaged position the space around the compression spring 64 is filled with a eutectic mixture whilst the camming element 40 is held at the disengaged position shown in FIG. 2. The eutectic mixture is then allowed to cool thereby holding the camming element at the disengaged position. In use, if failure of the generator results in excessive heating of the generator, the temperature rise causes the eutectic mixture located in duct 60 to melt thereby allowing the spring 64 to move and to urge the camming element along the direction of arrow A such that it becomes caught between the support 42 and the rotating member 32 which rotates, in this example, in a clockwise direction signified by arrow B. At the point of contact the surfaces of the rotating member and the camming element are moving in the same direction, thereby avoiding the problem of the camming element bouncing off the rotating member. Frictional engagement between the head 52 of the camming element 40 and the rotating member 32 gives rise to a force which further tries to pull the camming element into the gap between the rotating member 32 and the support 42 and, as the rear portion of the head 56 is significantly wider than that gap the camming element becomes jammed in the gap with a large force acting between it and the rotating member 32 thereby locking the rotating member 32 against further rotation, and thereby locking the generator against rotation. This rapid locking of the generator causes a large torque to be generated across the shear neck 20 thereby causing it to fail and to drivingly disconnect the generator from the prime mover.

Figure 3:
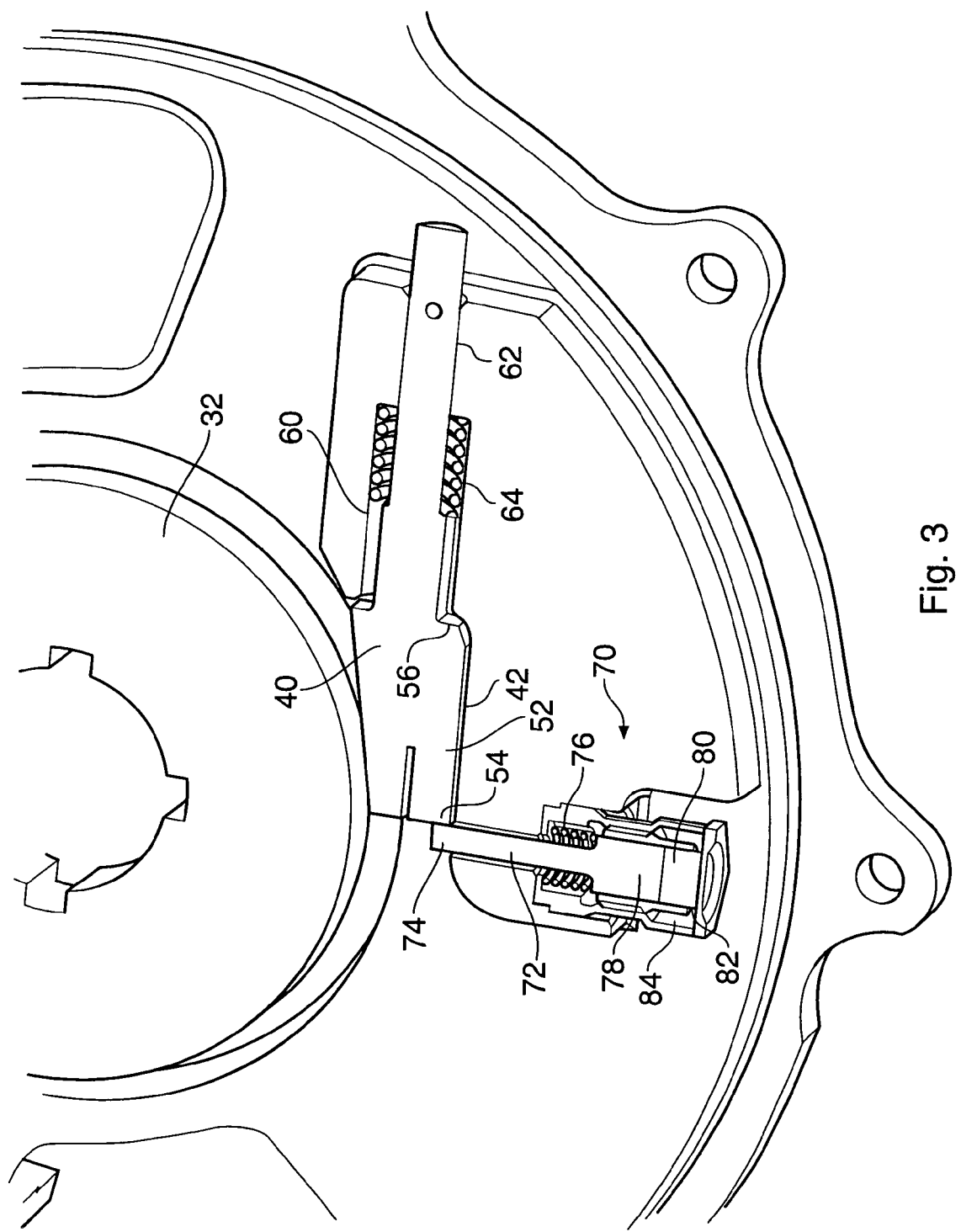
FIG. 3 is a perspective view of a further disconnect arrangement constituting an embodiment of the present invention.

FIG. 3 schematically illustrates a further disconnect mechanism constituting a refinement of that shown in FIG. 2. Essentially the design of the camming element 40 remains unchanged and it is still urged towards the engaged position by a compression spring 64. However in this arrangement there is no eutectic within the duct 60 in which the compression spring 64 is enclosed. Instead, a further release mechanism generally designated 70 is provided in which a spring loaded plunger 72 is positioned such that, in an armed state, an end portion 74 of the plunger 72 restrains the camming element 40 against movement towards its engaged position. In this example, the end portion 74 abuts an end face of the head 52 of the camming element 40. The plunger 72 is urged by a compression spring 76 to move to a position where the end portion 74 disengages from contact with the camming element 40. However the motion of the plunger 72 is restrained by a head end 78 of the plunger abutting a block of meltable material 80. The block of material 80 is typically a eutectic pellet. The eutectic pellet is held within a generally cylindrical cavity which, as shown in FIG. 3 has an opening 82 at an end portion thereof which allows the eutectic to escape into a further cavity 84. The cavity 84 is closed thereby ensuring that the melted eutectic remains trapped within the cavity and hence does not contaminate the lubricant for the generator. In operation, failure of the cooling/lubricating system or flooding of the generator results in a temperature rise. Once the temperature has risen sufficiently the eutectic 80 melts and can flow into the cavity 84. As the eutectic melts the plunger 72 becomes free to move under the urging of the compression spring 76 thereby disengaging from the camming element 40 which in turn becomes free to move from the disengaged position as shown in FIG. 3 to an engaged position in which it becomes jammed between the rotating member 32 and the support 42.

Figure 4:
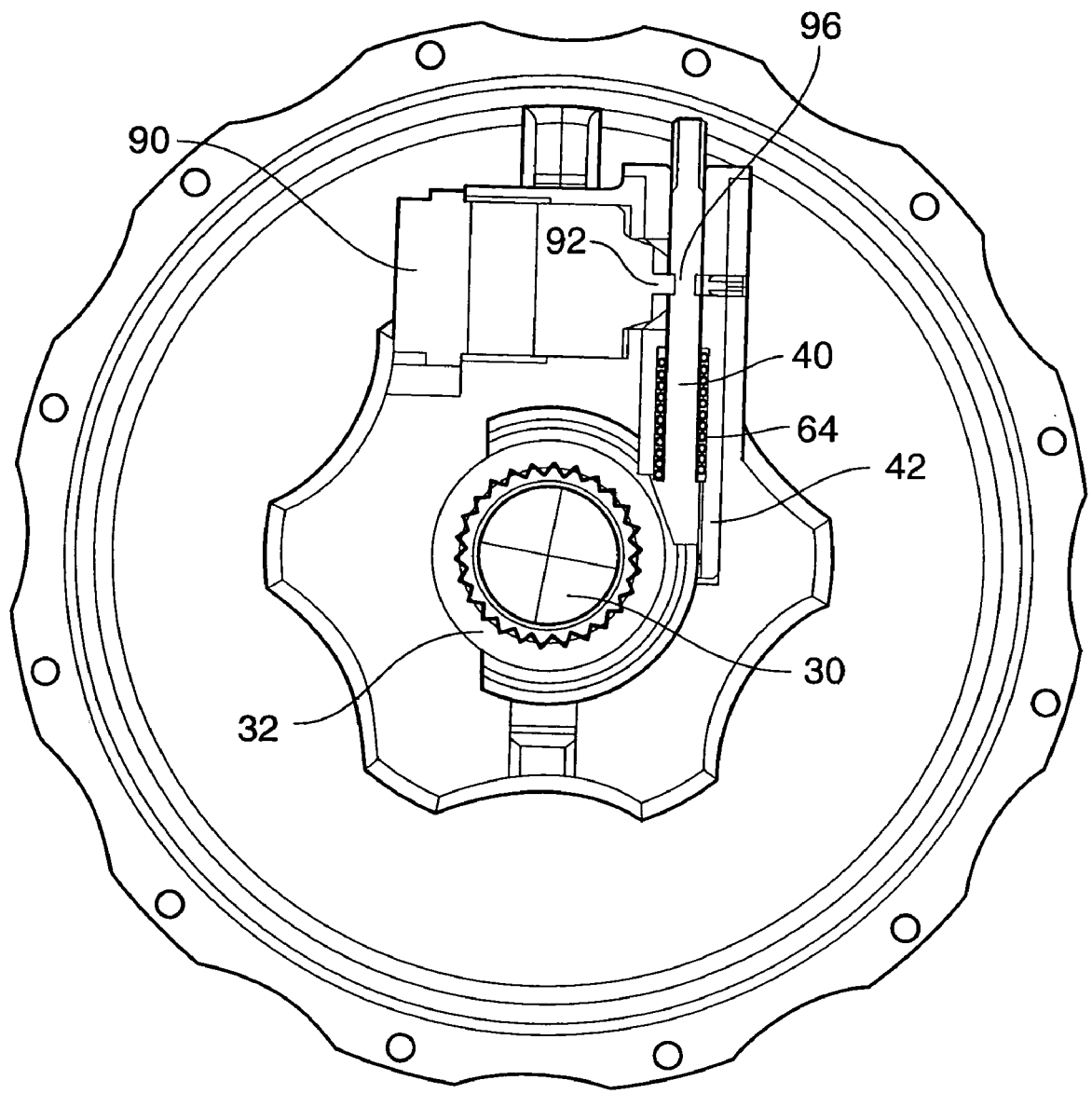
FIG. 4 is a plan view of a further disconnect arrangement at the disengaged position.
Figure 5:
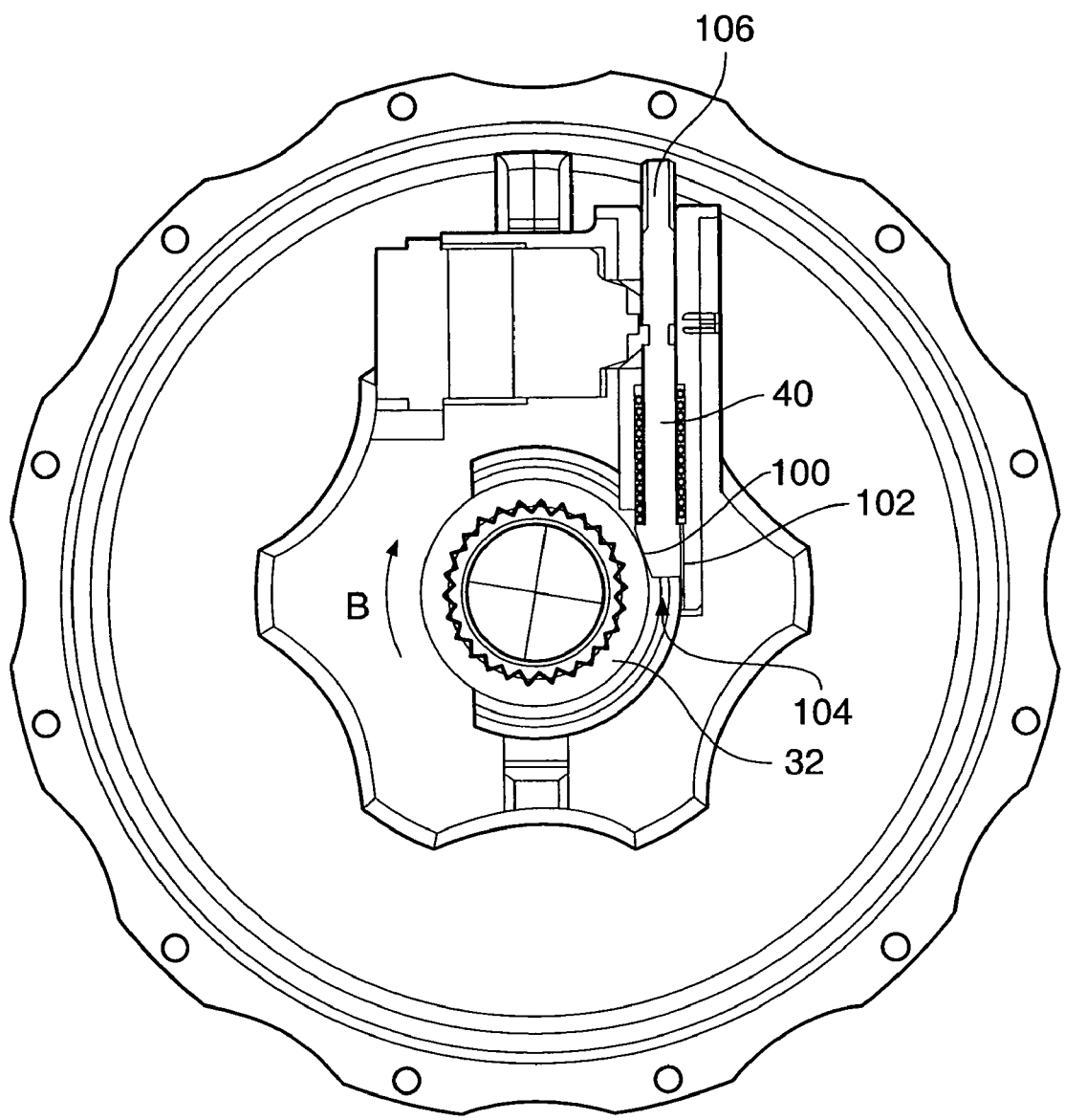
FIG. 5 shows the arrangement of FIG. 4 at the engaged position.

FIGS. 4 and 5 schematically show a further embodiment of the invention in the disengaged and the engaged positions, respectively. As before, the enlarged rotating element 32 is in splined engagement with the end of the rotor shaft 30. The camming element 40 is urged by compression spring 64 to move towards the engaged position and the camming element is also adjacent a support 42 which prevents it from being deflected away from the rotating element 32. In this embodiment a solenoid 90 is provided to control the operation of the disconnect mechanism. An armature of the solenoid 90 is connected to a locking element, such as a locking pin 92 which, as shown in FIG. 4, engages in a recess 96 formed in the tail 58 of the camming element 40. The locking pin 92 holds the camming element in the disengaged position. When it is desired to disconnect the generator from the prime mover, the solenoid 90 is energised so as to retract the locking pin 92 from engagement with the recess 96. The camming element 40 is therefore free to move under the urging of the compression spring 64 thereby resulting in a face 100 of the tapered head end of the camming element 40 engaging with the rotating element 32 whilst another face 102 of the head of the camming element is held against the support 42. Thus, as the rotating element rotates in a clockwise direction as shown by the arrow B it once again tries to pull the head of the camming element into the relatively small gap 104 causing further frictional engagement between the camming element 40 and the rotating element 32 which further serves to increase the frictional forces tending to stop the rotating element 32 from rotating and thereby to hold the rotor of the generator against rotation. The arrangement shown in FIGS. 4 and 5 has the advantage that the release mechanism can be tested on the ground with the generator stationary by operating the solenoid and observing whether the camming element 40 moves under the action of the spring 64. The test technician can then de-energise the solenoid 90 and grasp, either manually or with a tool, an end portion 106 of the camming element in order to move the camming element against the urging of the compression spring 64 and to return it to the disengaged, and armed position shown in FIG. 4.

Figure 6:
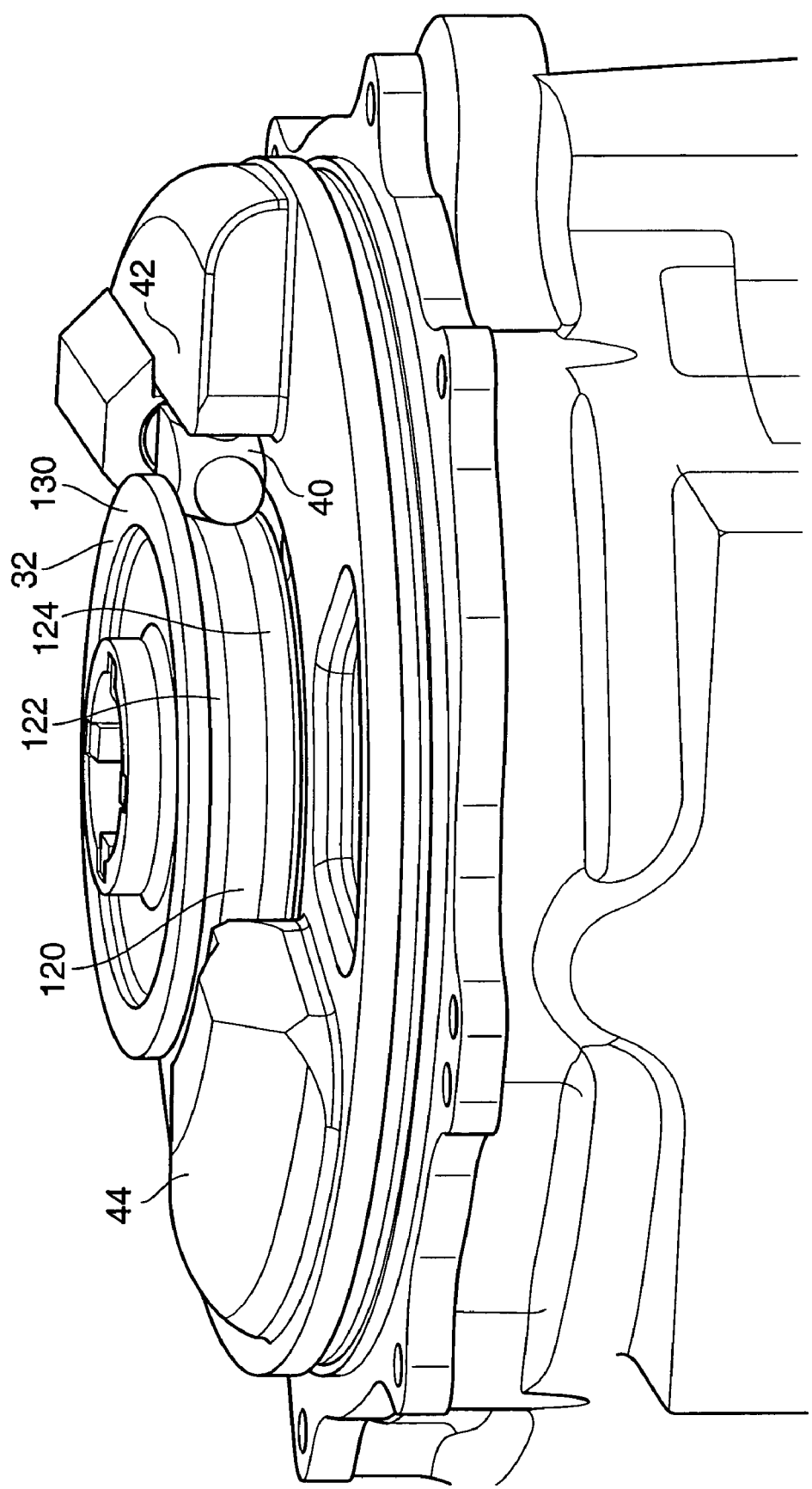
FIG. 6 is a perspective view showing the inter-engagement between the camming element and profiled rotating member.

FIG. 6 shows the relative profiles of the camming element 40 and the co-operating face of the rotating element 32 in greater detail. The face of the rotating element 32 which engages with the camming element 40 comprises a base region 120 bordered by inclined walls 122 and 124. This defines a generally part circular recess which matches with a corresponding profile on the camming element 40. Furthermore a flange region 130 is also provided to make sure that the camming element 40 cannot escape from inter-engagement with a rotating element 32 as it is trapped between the flange 130 and the base plate 50.

In each of these embodiments the bearings supporting the rotor shaft 30 and/or the splined engagement between the rotor shaft 30 and the rotating element 32 may allow for slight movement of the shaft 30 or rotating element 32 towards the abutment 44 such that motion of the camming element into the engaged position causes the shaft to move thereby bringing the rotating element 32 into frictional engagement with the abutment 44. This gives rise to an additional braking force which further resists the rotation of the rotor.

It is thus possible to provide a compact, simple and inexpensive disconnect mechanism which makes use of the shear region that is routinely provided in the drive train and which does not give rise to a significant increase in the axial length of the generator or the drive train.

In each of the above embodiments the camming member and/or the rotating member may be coated with a friction increasing material such as tungsten carbide or a coarse nickel composite.

The invention claimed is:

1. A disconnect device for disconnecting a driven device from a drive, where a drive transfer element having a shear region transmits torque between the drive and the driven device, the disconnect device comprising a camming element movable from a disengaged position to an engaged position, where the camming element becomes caught between a rotating member on the driven device side of the shear region and a support such that rotation of the rotating member urges the camming element into a space between the rotating member and the support, the direction of movement of the camming element and motion of a surface of the rotating member at a contact region being in substantially the same direction.

2. A disconnect device as claimed in claim 1, in which a driven shaft is connected to or extends from the driven device side of the shear region and the camming element engages with a surface of the shaft when the camming element moves to the engaged position.

3. A disconnect device as claimed in claim 1, in which a driven shaft is connected to or extends from the driven side of the shear region and the driven shaft has formed thereon or carries a disk of enlarged radius which engages with the camming element when the camming element moves to its engaged position.

4. A disconnect device as claimed in claim 1, in which a surface of the camming element facing towards the rotating member is non-planar so as to increase an area of frictional contact and engages with a co-operating surface of the rotating member when the camming element moves to the engaged position.

5. A disconnect device as claimed in claim 1, in which the camming element is biased towards the engaged position by biasing means and is releasably held at the disengaged position by a release device.

6. A disconnect device as claimed in claim 5 in which the release device comprises a locking element movable from a first position where it prevents motion of the camming element from the disengaged position to a second position where motion of the camming element to the engaged position is permitted.

7. A disconnect device as claimed in claim 5, in which the release device comprises a temperature sensitive element which softens or melts above a predetermined temperature, and the temperature sensitive element is located at a position where it acts to prevent motion of the camming element to the engaged position, and allows the camming element to move once the temperature exceeds the predetermined temperature.

8. A disconnect device as claimed in claim 6, in which the release device comprises a temperature sensitive element which softens or melts above a predetermined temperature, and the temperature sensitive element is located at a position where it acts to prevent motion of the locking element from the first position to the second position, and it allows the locking element to move to the second position when the predetermined temperature is exceeded.

9. A disconnect device as claimed in claim 8, in which the temperature sensitive element is held in a closed cavity so as to prevent it's escape from the cavity once it has softened or melted.

10. A disconnect device as claimed in claim 6, where the locking element is moved by a solenoid.

11. A generator in combination with a drive disconnect as claimed in claim 1.

12. A disconnect device as claimed in claim 1, in which at least one of the camming element and the rotating member has a friction increasing material applied thereto.

13. A disconnect device as claimed in claim 1, in which the support is positioned adjacent the rotating member in order that the camming element can bear against the support thereby preventing the camming element from being forced radially away from the rotating member.

14. A disconnect device as claimed in claim 1, in which the camming element comprises a tapered head and in the engaged position the tapered head engages with, and becomes trapped between, the rotating member and the support.

15. A disconnect device for disconnecting a driven device from a drive, where a drive transfer element having a shear region transmits torque between the drive and the driven device, the disconnect device comprising a camming element movable from a disengaged position to an engaged position where the camming element becomes caught between a rotating member on the driven device side of the shear region and a support such that the rotation of the rotating member urges the camming element into a space between the rotating member and the support and where at least one abutment is provided in a region on a side of the rotating element generally opposite the position of the camming element, and limited displacement of the rotating element towards the abutment occurs when the camming element is moved to the engaged position such that the rotating element frictionally engages with the abutment.

* * * * *